INVENTOR.
CARL W. KAESEMEYER

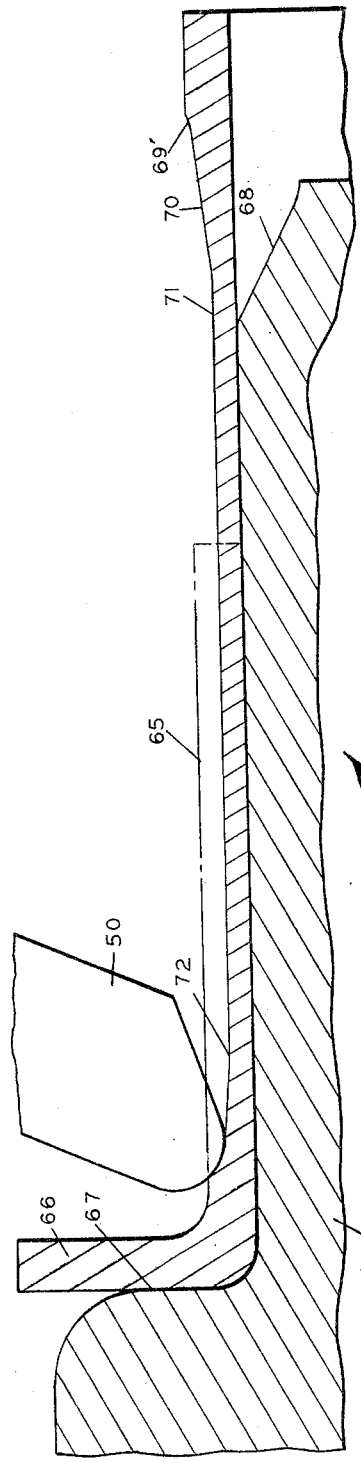

United States Patent Office 3,282,078
Patented Nov. 1, 1966

3,282,078
METHOD OF MAKING GROOVED HOLLOW ARTICLE
Carl W. Kaesemeyer, Cincinnati, Ohio, assignor to The Cincinnati Milling Machine Co., Cincinnati, Ohio, a corporation of Ohio
Filed Dec. 23, 1963, Ser. No. 332,537
5 Claims. (Cl. 72—82)

This invention relates to a method of forming a hollow, metal article of varying contour from a generally tubular workpiece blank. More particularly, the invention has to do with a novel method of forming an annular groove on a hollow, cylindrical workpiece, the groove being pressed into the circumferential wall of the workpiece by a unique type of spinning operation.

In recent years considerable use has been made of the power spinning process to form conical or curvilinear bodies of revolution from flat sheet or plate. The process has also been used in the manufacture of tubular parts from hollow cylindrical preforms. In either case, the basic process involves a mandrel and a workpiece blank which are rotated simultaneously beneath forming rollers which plastically deform the metal and cause it to conform to the shape of the mandrel. While all bodies of revolution are made up of tubular, conical, or curvilinear surfaces, difficulties are sometimes encountered in spinning parts formed of a combination of these three basic shapes. For example, it was found after a considerable number of attempts that it was not possible, by the use of conventional power spinning techniques, to form an annular groove on a tubular part such as a wheel rim. Initial attempts made to form the groove using an appropriately contoured roller invariably resulted in failure. Either the workpiece material separated due to the high stresses imparted by the grooving roller, or the contour and wall thickness of the part within the area of the groove was not in conformity with specifications. An effort was made to hot spin the part but this created other problems such as side flow of the metal, loss of cold working properties, etc. A hand spinning technique was also tried but found impractical since the contour of the finished part could not be held to specifications. It was not until the method which comprises the subject matter of the present invention was employed that satisfactory parts could be made on a job lot basis.

Briefly, the approach which was found to be successful involves placing a rim-like blank on a mandrel having a relief on the outer end corresponding in shape to that of the inside diameter of the inner side wall of the groove. The mandrel and blank are then rotated and the wall of the rim is tube spun to form it to the correct configuration and wall thickness. During this spinning step, the necessary thickness of metal is left at the outer end of the blank for forming the groove in a subsequent forming operation. Also, during this step, the reduction in thickness of the metal causes it to extrude outwardly on the mandrel so that, at the conclusion of the tube spinning step, the end of the tubular part extends beyond the outer end of the mandrel. The tail pad of the machine is next brought into contact with the protruding end of the part, the pad being provided on its forward face with a tapered or conical surface which is adapted to enter the open end of the part and apply an outwardly directed thrust thereon. During the groove forming operation, it is important that the tailstock pad be urged against the end of the part with a steady, predetermined force so that it will at all times tend to expand the end of the part outwardly. This outward expansion of the part will not take place, however, until the groove forming tool or roller is brought into engagement with the peripheral wall of the part. This roller is provided with an inclined surface which is disposed approximately parallel to the face of the relief on the end of the mandrel and also with a radius nose for forcing the metal into the bottom of the groove. As the mandrel, part, and tailstock pad rotate as a unit, the roller is fed into the groove formed by the relief on the end of the mandrel and the conical surface on the tailstock pad, the roller being fed in along an inclined path which is substantially parallel to the conical face provided on the tailstock pad. As the forming tool moves inwardly, the tailstock pad also moves in under the influence of the continuous pressure applied thereto, and flares the end of the part outwardly to thereby assist the roller in forming the walls of the groove. After the groove has thus been formed, it may be compressed to narrow the opening thereof and to provide a smaller radius of curvature at the bottom of the groove by a succeeding operation performed on the part after the tailstock pad has been moved away.

There is thus provided a method of spin-forming a groove in a tubular workpiece which can be carried out on a conventional spinning machine and which requires only existing parts of the machine for its performance.

A further object of the invention is to provide a method of forming a groove in a tubular or rim-like workpiece in which an outward pressure is applied to the wall of the part at the same time that an inward pressure is being applied thereto by a forming roller so as to bend the metal beneath the roller and form an annular groove in the part.

Another object of the invention is to provide a method of forming a groove in the peripheral wall of a tubular workpiece in which a combined outward and axially compressive force is applied to the wall of the workpiece adjacent one side of the groove while a forming tool applies an inward force thereto to press the metal into the bottom of the grove.

Another object of the invention is to provide a method of forming a circumferential groove adjacent the end of a tubular workpiece wherein, after the groove has been formed therein, a stepped roller is utilized to bend the outer wall of the groove into a substantially radial plane while applying a compressive force thereon to reduce the tensile stress on the bottom of the groove.

With these and other objects in view, which will become apparent from the following description, the invention includes certain novel methods of operation, the essential features of which are set forth in the appended claims, and a preferred form or embodiment of which will hereinafter be described with reference to the drawings which accompany and form a part of this specification.

In the drawings:

FIG. 2 is a fragmentary cross-sectional view showing one phase of the forming operation.

FIG. 3 is a fragmentary cross-sectional view showing another portion of the forming operation.

FIG. 4 is a fragmentary cross-sectional view showing still another portion of the forming operation.

FIG. 5 is a fragmentary cross-sectional view showing the final step of the forming operation.

Figure 1:
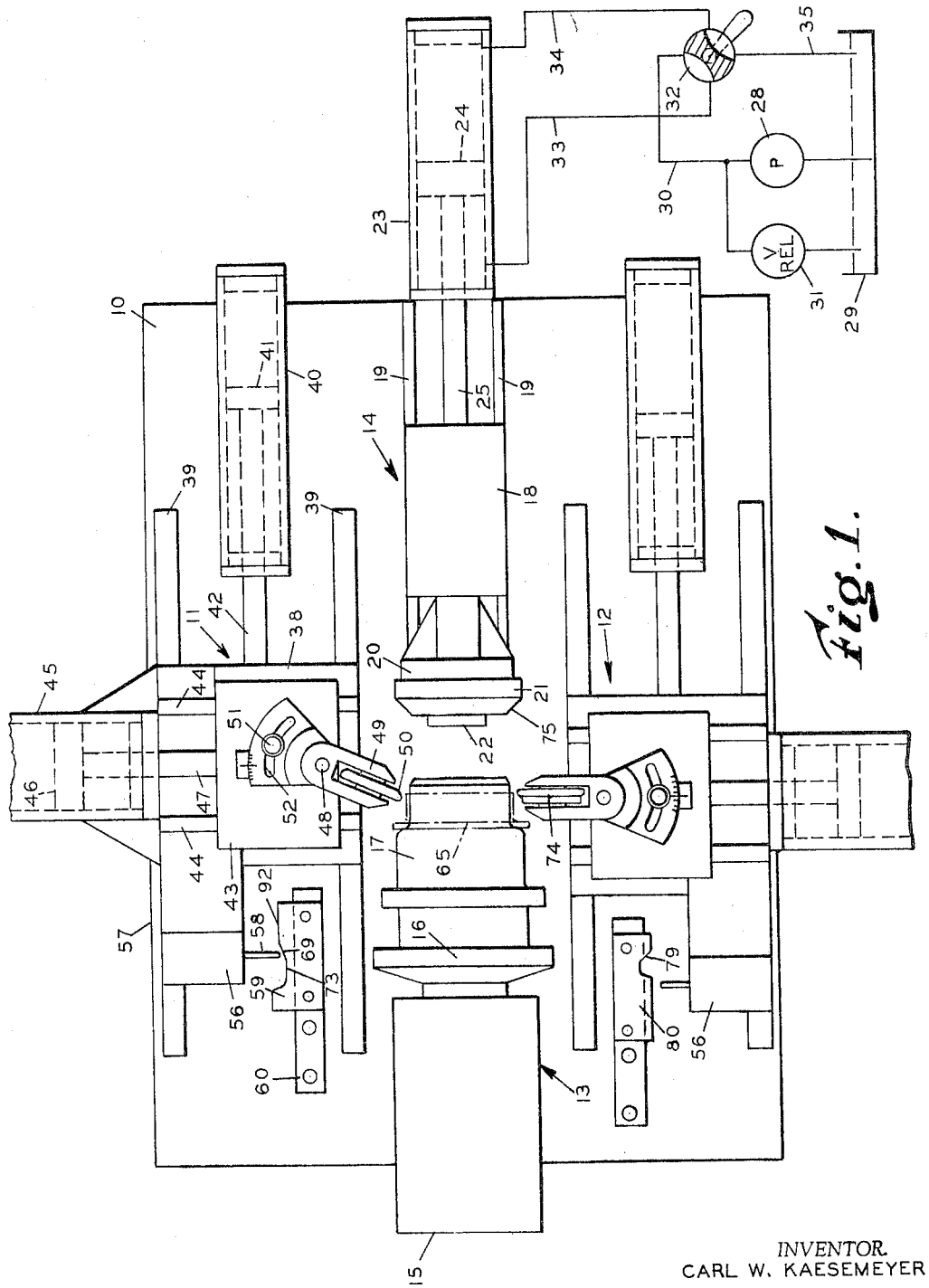
FIG. 1 is a schematic plan view of a power spinning machine on which the method of the present invention may be performed.

The spinning machine shown in FIG. 1 of the drawings illustrates merely one possible embodiment of a structure which may be utilized in performing the present invention. It will be understood, as the description of the new forming method proceeds, that other types of power spinning apparatus could be used with equal effectiveness. The representation of the machine in FIG. 1 is schematic in nature and for a more detailed description of the construction and operation of such a machine, reference is made to U.S. Patent No. 3,109,400 granted November 5, 1963, on an application filed by Richard A. Paulton.

The general arrangement of the machine, as illustrated by FIG. 1 of the present drawings, includes a bed 10 on which are mounted tool units 11 and 12, a headstock unit 13, and a tailstock unit 14. The headstock unit includes a spindle mounted in a housing 15 and driven by an electric motor (not shown). Secured to the spindle is a face plate 16 to which is secured a mandrel 17.

The tailstock unit 14 includes a housing 18 supported for longitudinal sliding movement on a pair of spaced ways 19 attached to the bed 10. The housing 18 contains journal bearings for supporting a tailstock spindle for free rotation about an axis coinciding with the axis of rotation of the mandrel 17. Mounted on the spindle is a plate 20 to which is attached a tailstock pad 21. This pad is provided with a pilot portion 22 which is adapted to enter a recess of corresponding size and shape provided in the outer end of the mandrel 17 when the tailstock is moved into active position. Longitudinal movement of the tailstock on the ways 19 is effected by a hydraulic cylinder 23 containing a piston 24 mounted on the end of a piston rod 25. The piston rod extends beyond the cylinder 23 where it is attached to the housing 18 of the tailstock.

A source of hydraulic fluid under pressure is provided for actuating the piston 24 within cylinder 23. As shown in FIG. 1, this equipment includes a pump 28 which, when driven by an electric motor or other source of motive power, withdraws hydraulic fluid from the tank 29 and supplies it under pressure to a line 30. The pressure of the fluid in line 30 may be maintained at a predetermined value by means of a relief valve 31 which is connected to the pressure line and is set to open at a predetermined pressure to return excess fluid to the tank 29. Delivery of pressure fluid from line 30 to the cylinder 23 is controlled by a valve 32 which, in the position shown, connects line 30 with a cylinder line 33 connected to the left-hand end of the cylinder. The right-hand end of the cylinder is connected by a line 34 to a line 35 emptying into the tank 29. Hence, pressure will be applied to the left-hand end of the cylinder 23 thereby moving the tailstock to the right away from the mandrel 17. When it is desired to move the tailstock into engagement with the mandrel, the valve 32 is turned so as to connect cylinder line 34 with pressure line 30 and cylinder line 33 with drain line 35 whereby pressure will be applied to the right-hand end of the cylinder and move the tailstock toward the mandrel.

A brief description will be given of the tool unit 11, it being understood that the tool unit 12 is similar in all respects to the unit being described. The tool unit 11 includes a main slide 38 which is supported for longitudinal sliding movement on a pair of spaced, parallel ways 39 secured to the bed 10. Power movement of the main slide is effected by a hydraulic cylinder 40 which is fitted with a piston 41 connected to a piston rod 42 attached to the main slide 38.

Supported on the main slide for transverse sliding movement thereon is a cross slide 43 mounted on spaced parallel ways 44 on the main slide. Power operation of the cross slide is effected by a hydraulic cylinder 45 containing a piston 46 connected to a piston rod 47 which is attached to the cross slide.

Pivoted at 48 on the cross slide is a bifurcated support 49 in which is journalled a forming tool or roller 50. The angle of inclination made by the roller 50 with the axis of the mandrel 17 may be adjusted by manipulation of a clamping bolt 51 received in an arcuate slot 52 provided in the rear portion of the support 49.

It will be observed from the foregoing description that the forming tool may be moved in a radial direction toward or from the mandrel by means of the cylinder 45 and that it may simultaneously be moved in a direction parallel to the axis of the mandrel by means of the cylinder 40. In order to accurately and automatically correlate the simultaneous movement of the tool in the two aforesaid directions, there is provided a tracing head 56 secured to the cross slide 38 by means of a bracket 57. The tracing head is provided with a finger or stylus 58 adapted to engage with the contoured edge of a template 59 fastened to a support 60 mounted on the bed 10. Hence, as the main slide 38 is moved into the longitudinal direction by cylinder 40, the finger 58 will move along the template and sense variations in the shape thereof. A tracing valve contained in the tracing head 56 is operated by the finger 58 to control the flow of the hydraulic fluid to and from the cylinder 45 in such a manner as to cause the cross slide and tracing finger to follow the contour of the template.

In order to fully explain the novel method constituting the present invention, it will be described in connection with the formation of a snap ring groove provided along one edge of a wheel rim used to support a pneumatic tire on a wheeled vehicle such as a truck or trailer. The blank from which the finished part is to be formed is shown in dot-dash outline in FIG. 1 where it is indicated by reference numeral 65. As shown in greater detail in FIG. 2, the blank 65 is of a generally tubular configuration and is provided on one end with a radially extending flange 66 the purpose and shaping of which is not relevant to the present invention. The flange does, however, provide an end stop for a blank on the mandrel and prevents inward axial movement of the blank during processing due to the engagement of the flange with a shoulder 67 provided on the mandrel. As also shown in FIG. 2, the mandrel 17 is provided at its outer end with a relief or taper 68 the inclination and shape of which corresponds to that of one side of the final groove to be formed in the part.

In the first part of the operation, the forming tool or roll 50 is guided into the blank along an angle determined by the portion 69 of the template 59. In FIG. 2 the point of entry of the roller 50 with the workpiece blank is indicated by reference numeral 69' and, as the roller deforms the material of the workpiece, it will be extruded to the right as viewed in FIG. 2 inasmuch as left-hand movement is prevented by the shoulder 67 on the mandrel. Consequently, a gradual taper indicated by reference numeral 70 is provided on the part which thereafter merges into a section of uniform wall thickness starting at 71 and continuing to the point designated by reference numeral 72. Here the thickness of the part is again increased by reason of a gradual taper produced by the template 59. The straight portion of the part between points 71 and 72 is, of course, generated by the straight edge 73 formed on the template.

As shown in FIG. 2, the tube spinning operation on the workpiece is substantially complete and the outer end of the part is shown extending beyond the end of the mandrel in the position which it assumes at the end of this operation.

The next step in the process involves moving in the tailstock so that a beveled or frusto-conical surface 75 on the pad 21 engages against the end of the partially formed workpiece and is held in pressural contact therewith by the thrust exerted by the hydraulic cylinder 23. This is brought about by turning the valve 32 so as to connect pressure line 30 with cylinder line 34. Thereby, the pad will be moved against the end of the workpiece and a force will be applied thereto having an axially inward component 76 and a radially outward component 77 (FIG. 3).

With the tailstock pad thus pressing against the end of the workpiece, a forming roller 74 on the tool unit 12 is employed to deform the end of the workpiece into the groove formed by the surfaces 68 and 75. The path followed by the roller is indicated by the dotted arrow 78

(FIG. 3), this movement being controlled by a contoured edge 79 formed on a template 80 (FIG. 1) which is arranged for cooperation with the tracing head 56 for the tool unit 12. As the nose 81 (FIG. 3) of the roller 74 presses inwardly on the workpiece, a bending force is exerted thereon which is assisted by the flaring action of the conical surface of the tailstock pad 21 to form the end of the workpiece into the shape shown in FIG. 4. The short axial movement occurring at the end of the inward travel of roller 74, as indicated by reference numeral 82 in FIG. 3, acts to cause an inclined face 83 on the roller to force that portion of the workpiece forming the inside wall of the groove against the tapered surface 68 on the end of the mandrel. Thereby, the inside wall portion 84 of the part is deformed to the proper shape and thickness at the end of the inward plunge of roller 74. The roller also is provided with a substantially cylindrical surface 85 which is adapted to press against the cylindrical portion of the workpiece immediately behind the groove being formed therein in order to insure dimensional stability of this section of the workpiece.

By virtue of the simultaneous application of the axially inward and radially outward forces 76 and 77 to the workpiece by the inclined face 75 of the tailstock pad 21, the bending of the workpiece to form the groove therein is effected without any severe stretching of the workpiece material in the bottom of the groove such as would tend either to crack the part at this point or cause undue distortion of the part in the bottom of the groove.

The angle of inclination of the surface 75 on the tailstock pad is of some importance since if it is too steep, the outward force component 77 will not be sufficient to provide the outward thrust necessary to flare the end of the part as the roller 74 moves into the groove. On the other hand, if the angle of inclination of the surface 75 is too shallow, the outside wall 86 (FIG. 4) of the groove will lie at too low an angle to permit further inward bending of this wall in the next step of the process. A desirable angle for the surface 75 has been found to be approximately 45 degrees although some departure from this value in either direction can be tolerated without impairing the effectiveness of the groove forming process.

The force applied to the tailstock pad is not critical it only being necessary that sufficient pressure be provided to produce the flaring action desired. In one application of the process wherein the wall thickness of the workpiece blank 65 was 3/8" with an inside diameter of approximately 20", the force applied to the tailstock pad was in the range of from 15,000 to 25,000 pounds.

The final step in the formation of the groove 87 (FIG. 5) in the wheel rim part involves the application of combined axial inward and radial inward forces on the outside wall 86 of the groove to form it into a substantially radial plane as indicated in FIG. 5. This is accomplished by means of a forming roller 88 which is provided with a radially extending face 89 and a peripheral or axially extending face 90. The surfaces 89 and 90 are joined by a curved surface or radius 91 which aids in guiding the end of the workpiece into its final position. To effect this final phase of the process, the tailstock pad 21 is moved away from the end of the part and the stepped roller 88, which may be substituted for either of the tools 50 or 74 (FIG. 1), is moved into the position shown in solid outline in FIG. 5. The inward movement of the roller may be limited by a fixed stop limiting movement of the cross slide 43 under the influence of its piston 46. Whether a fixed stop is used or a template having a straight surface thereon, such as the edge 92 on template 59, to limit the inward movement of the tool 88, the inward movement of the roller should be such as to cause the surface 90 to make contact with the corner 93 of the part and deform it slightly inwardly, say 1/8". The main slide 38 is then moved to the left as viewed in FIG. 1 by means of its cylinder 40 through the necessary distance to bend the wall 86 of the groove into an upright position as shown in FIG. 5 where it lies in a substantially radial plane. The combined radial and axial inwardly directed forces applied to the outside wall portion 86 causes bending of the wall to be effected in such a manner as to decrease the radius of curvature 94 in the bottom of the groove while at the same time preventing a large tensile stress from being produced in the outer surface 95 of the bend.

With this operation the formation of the groove is completed and all that remains to be done in this connection is to trim the excess metal from the part along the dotted line indicated by reference numeral 96 in FIG. 5. This may be done by conventional means either before or after removing the part from the mandrel.

It is to be understood, of course, that the foregoing disclosure is intended to be illustrative only and that changes and modifications may be resorted to without departing from the scope of the invention as defined by the appended claims.

What is claimed is:

1. The method of forming an outwardly-opening circumferential groove in a substantially tubular workpiece with a pressure forming tool, the workpiece being mounted on a mandrel provided with a relief on its outer end, comprising the steps of restraining the workpiece against axial inward movement on said mandrel, imparting relative rotation between the workpiece and the forming tool, pressing the forming tool into the workpiece over the unreduced portion of the mandrel and spaced inwardly from the outer end of the workpiece, moving the tool axially inward to reduce the wall thickness of the intermediate portion of the workpiece and cause it to extrude outwardly and extend beyond the outer end of the mandrel, applying axially inward and radially outward directed force components to the outer end of the workpiece by a conical surface on a pad pressed axially against the outer end of the workpiece, then feeding the forming tool inwardly against the surface of the workpiece adjacent to the outer end thereof while said force components are applied thereto so as to press the workpiece into the groove provided by the relief on the end of the mandrel and the conical surface on the pad to thereby form an outwardly opening groove on the end of the workpiece.

2. The method of claim 1 including the additional step of simultaneously applying axially and radially inward directed forces to the outer flange of the groove to bend it into a substantially radial plane.

3. The method of forming an outwardly-opening circumferential groove in a substantially tubular workpiece with a pressure forming tool, the workpiece being formed on a mandrel provided with a relief at its outer end, comprising the steps of restraining the workpiece against axial inward movement on said mandrel, imparting relative rotation between the workpiece and the forming tool while applying axially inward and radially outward directed force components to the outer end of the workpiece, and then feeding the forming tool inwardly against the surface of the workpiece adjacent to the outer end thereof while said force components are applied thereto so as to press the workpiece into the relief provided on the end of the mandrel to thereby form an outwardly opening groove on the end of the workpiece, the inward feeding movement of the forming tool being effected in an axially inward direction as well as in a radially inward direction to thereby cause the tool to move toward the relief on the mandrel along an inwardly inclined path and press the inner wall of the groove against the relief on the mandrel.

4. The method of claim 3 wherein the axially inward and radially outward directed force components are applied to the workpiece by pressing a conical surface on a pad axially against the outer end of the workpiece.

5. The method of claim 3 including the additional step of applying simultaneously axially and radially inward directed forces to the outer flange of the groove to bend it into a substantially radial plane.

References Cited by the Examiner

UNITED STATES PATENTS

| | | | |
|---|---|---|---|
| 1,680,061 | 8/1928 | Nelson | 113—116 |
| 1,828,464 | 10/1931 | Harrison | 72—82 |
| 2,247,002 | 6/1941 | Rendleman | 29—159 |
| 2,932,890 | 4/1960 | Sporck et al. | 29—554 |
| 3,120,206 | 2/1964 | Sporck | 72—81 |

FOREIGN PATENTS 64,769　3/1928　Sweden.

CHARLES W. LANHAM, *Primary Examiner.*
RICHARD J. HERBST, *Examiner.*